United States Patent
Manmohan

(10) Patent No.: US 9,100,440 B1
(45) Date of Patent: Aug. 4, 2015

(54) SYSTEMS AND METHODS FOR APPLYING DATA LOSS PREVENTION POLICIES TO CLOSED-STORAGE PORTABLE DEVICES

(71) Applicant: Symantec Corporation, Mountain View, CA (US)

(72) Inventor: Sarin Sumit Manmohan, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/245,994

(22) Filed: Apr. 4, 2014

(30) Foreign Application Priority Data

Feb. 20, 2014 (IN) .............................. 220/KOL/2014

(51) Int. Cl.
*G06F 21/60* (2013.01)
*G06F 21/62* (2013.01)
*H04L 29/06* (2006.01)

(52) U.S. Cl.
CPC .............. *H04L 63/20* (2013.01); *G06F 21/604* (2013.01); *G06F 21/62* (2013.01)

(58) Field of Classification Search
None
See application file for complete search history.

(56) References Cited

U.S. PATENT DOCUMENTS

2007/0235537 A1* 10/2007 Yoneda et al. ................. 235/435
2010/0162347 A1* 6/2010 Barile ............................... 726/1

OTHER PUBLICATIONS

Paul F. MacKay, et al; Systems and Methods for Replacing Sensitive Information Stored Within Non-Secure Environments with Secure References to the Same; U.S. Appl. No. 12/966,307, filed Dec. 13, 2010.
"McAfee", www.mcafee.com, as accessed Dec. 2, 2013, (Feb. 29, 2000).
"Windows Portable Devices", http://msdn.microsoft.com/en-us/library/windows/desktop/dd388998(v=vs.85).aspx, as accessed Dec. 2, 2013, Microsoft, (Oct. 24, 2011).
"Windows Shell", http://msdn.microsoft.com/en-us/library/windows/desktop/bb773177(v=vs.85).aspx, as accessed Dec. 2, 2013, Microsoft, (Sep. 25, 2011).
"Component Object Model (COM)", http://msdn.microsoft.com/en-us/library/windows/desktop/ms680573(v=vs.85).aspx, as accessed Dec. 2, 2013, Microsoft, (Sep. 30, 2011).
"Stream Object (ADO)", http://msdn.microsoft.com/en-us/library/windows/desktop/ms675032(v=vs.85).aspx, as accessed Dec. 2, 2013, Microsoft, (Sep. 25, 2011).

(Continued)

*Primary Examiner* — Gilberto Barron, Jr.
*Assistant Examiner* — Devin Almeida
(74) *Attorney, Agent, or Firm* — ALG Intellectual Property, LLC

(57) ABSTRACT

A computer-implemented method for applying data loss prevention policies to closed-storage portable devices may include (1) injecting a data loss prevention component into at least one application process that is running on a computing device, (2) intercepting, via the data loss prevention component, an attempt by the application process to transfer a file to a closed-storage portable device that is connected to the computing device, (3) identifying a data loss prevention policy that applies to the attempt by the application process to transfer the file, (4) determining that the attempt by the application process to transfer the file violates the data loss prevention policy, and (5) performing a security action in response to determining that the attempt by the application process to transfer the file violates the data loss prevention policy. Various other methods, systems, and computer-readable media are also disclosed.

20 Claims, 6 Drawing Sheets

(56) References Cited

OTHER PUBLICATIONS

"Websense", http://www.websense.com/content/Home.aspx, as accessed Dec. 2, 2013, Websense, Inc., (Oct. 24, 2008).

"RSA", http://www.emc.com/domains/rsa/index.htm, as accessed Dec. 2, 2013, EMC Corporation, (Feb. 27, 2012).

* cited by examiner

SYSTEMS AND METHODS FOR APPLYING DATA LOSS PREVENTION POLICIES TO CLOSED-STORAGE PORTABLE DEVICES

BACKGROUND

Organizations are increasingly allowing employees to bring and use their own devices (such as smartphones, portable storage devices, etc.) in the workplace. While the use of such devices may empower employees, organizations must work to ensure that proper data loss prevention systems are in place to prevent sensitive data from leaking, either inadvertently or maliciously, via these devices.

Smart devices and other portable storage devices typically connect to and transfer data to/from endpoint computing systems using either mass-storage or closed-storage protocols. When a portable device connects to an endpoint computing system using a mass-storage protocol (such as the Mass Storage Class (MSC) protocol), the endpoint generally assumes absolute control over storage on the portable device as a block-level device. In this scenario, data loss prevention software installed on the endpoint may effectively monitor and apply data loss prevention policies to data that is copied from the endpoint to the portable device by intercepting file system activity involving the same.

However, when a portable storage device connects to an endpoint computing system using a closed-storage protocol, such as Media Transfer Protocol (MTP) or Picture Transfer Protocol (PTP), the actual file system and storage are implemented by the portable device itself, not the endpoint. Unfortunately, because the file system and storage on such portable devices are not managed by the endpoint, conventional data loss prevention software on the endpoint may be unable to effectively monitor and apply data loss prevention policies to data copied to these portable devices.

Some data loss prevention systems attempt to address this problem by prohibiting the use of such devices and/or by allowing the use of such devices on a per-user basis. While denying user access to smartphones and other portable devices may effectively prevent data leaks via such devices, this may also hamper the legitimate or harmless use of such devices, potentially frustrating employees and organizations.

As such, the instant disclosure identifies and addresses a need for a more efficient and effective mechanism for applying data loss prevention policies to closed-storage portable devices.

SUMMARY

The present disclosure describes various systems and methods for applying data loss prevention policies to closed-storage portable devices by injecting data loss prevention components into application processes and then identifying (and caching metadata associated with) attempts by these application processes to call Application Programming Interfaces (APIs) used to read and/or write data to closed-storage portable devices. In one example, a computer-implemented method for performing such a task may include (1) injecting a data loss prevention component into at least one application process that is running on a computing device, (2) intercepting, via the data loss prevention component, an attempt by the application process to transfer a file to a closed-storage portable device that is connected to the computing device and that contains an internally managed file system that is not accessible to the computing device, (3) identifying a data loss prevention policy that applies to the attempt by the application process to transfer the file, (4) determining that the attempt by the application process to transfer the file violates the data loss prevention policy, and then (5) performing a security action in response to determining that the attempt by the application process to transfer the file violates the data loss prevention policy.

In some examples, the step of intercepting the attempt by the application process to transfer the file may involve intercepting an attempt by the application process to call an API that facilitates the transfer of data to the closed-storage portable device. For example, the systems described herein may intercept attempts by the application process to call APIs used to create stream and/or data objects.

In one example, the above-described computer-implemented method may also include identifying and caching metadata associated with the attempt to call the API. This metadata may identify, among other identifying characteristics, (1) the file's name, (2) a file path for the file, (3) the file's size, (4) a device name associated with the closed-storage portable device, (5) a device identifier associated with the closed-storage portable device, and/or (6) a device manufacturer associated with the closed-storage portable device. In this example, the method may further include uniquely identifying, by analyzing the cached metadata, the file and/or the closed-storage portable device. The computer-implemented method may also include sending the metadata to a data loss prevention agent that uses the metadata to (1) identify the data loss prevention policy that applies to the attempt by the application process to transfer the file and/or (2) determine that the attempt by the application process to transfer the file violates the data loss prevention policy.

In some embodiments, the step of performing the security action may include (1) scanning the file for sensitive information, (2) blocking the attempt by the application process to transfer the file, (3) logging information about the attempt by the application process to transfer the file, and/or (4) notifying a security administrator about the attempt by the application process to transfer the file.

In some examples, the systems and methods described herein may inject the data loss prevention component into each application process running on the computing device. In addition, the step of intercepting the attempt by the application process to transfer the file may include suspending the attempt by the application process to transfer the file.

According to some embodiments, a system for implementing the above-described method may include (1) an injection module, stored in memory, that injects a data loss prevention component into at least one application process that is running on a computing device, (2) an interception module, stored in memory, that intercepts (via the data loss prevention component) an attempt by the application process to transfer a file to a closed-storage portable device that is connected to the computing device, (3) an identification module, stored in memory, that identifies a data loss prevention policy that applies to the attempt by the application process to transfer the file, (4) a determination module, stored in memory, that determines that the attempt by the application process to transfer the file violates the data loss prevention policy, (5) a security module, stored in memory, that performs a security action in response to determining that the attempt by the application process to transfer the file violates the data loss prevention policy, and (6) a processor configured to execute the injection, interception, identification, determination, and security modules.

A corresponding computer-readable medium may include one or more computer-executable instructions that, when executed by at least one processor of a computing device, may cause the computing device to (1) inject a data loss prevention component into at least one application process that is running on the computing device, (2) intercept, via the data loss prevention component, an attempt by the application process to transfer a file from the computing device to a closed-storage portable device that is connected to the computing device, (3) identify a data loss prevention policy that applies to the attempt by the application process to transfer the file, (4) determine that the attempt by the application process to transfer the file violates the data loss prevention policy, and (5) perform a security action in response to determining that the attempt by the application process to transfer the file violates the data loss prevention policy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
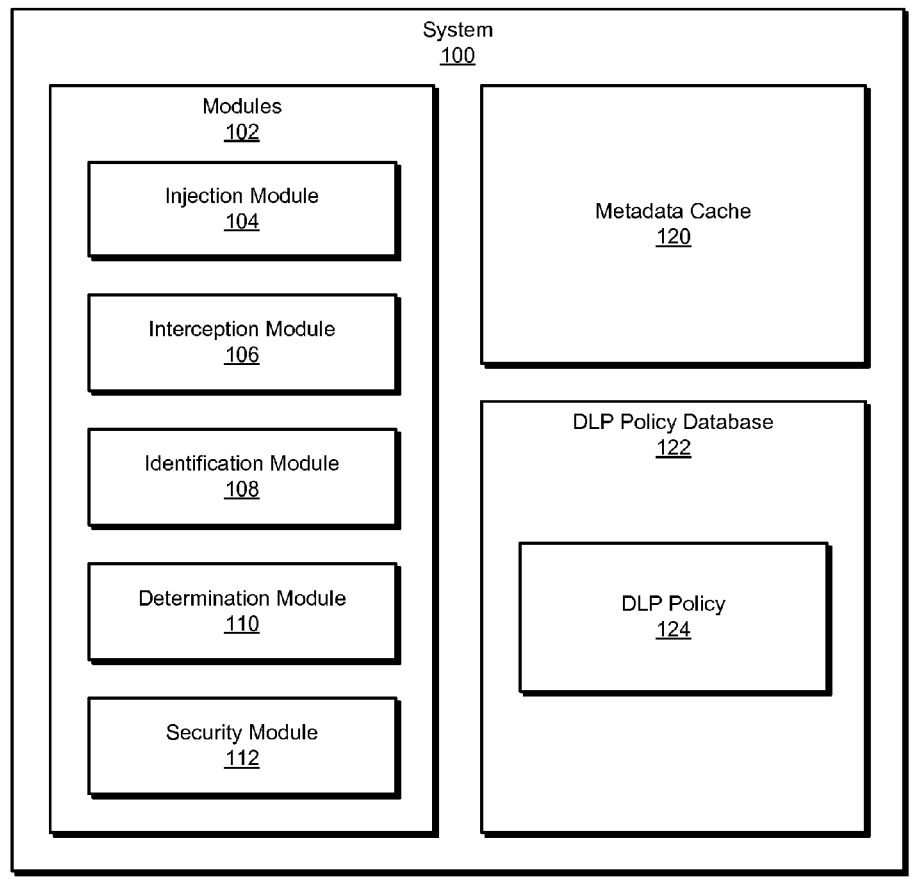
FIG. 1 is a block diagram of an exemplary system for applying data loss prevention policies to closed-storage portable devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for applying data loss prevention policies to closed-storage portable devices. As will be explained in greater detail below, by injecting a data loss prevention component into one or more application processes running on a computing device, the systems and methods described herein may detect (and apply data loss prevention policies to) attempts by the application processes to transfer files from the computing device to closed-storage portable devices. Specifically, by identifying (and caching metadata associated with) attempts by application processes to call APIs used to read and/or write data to closed-storage portable devices, the systems and methods described herein may effectively identify (using, e.g., various heuristics) the files and/or storage devices that are the targets of such file-transfer attempts, even if the storage devices are connected via closed-storage protocols such as MTP or PTP. This may in turn may allow software security vendors to provide clients with robust, nuanced, content-aware data loss prevention systems that are capable of blocking file-transfer attempts to closed-storage portable devices on a case-by-case (as opposed to wholesale) basis.

Figure 2:
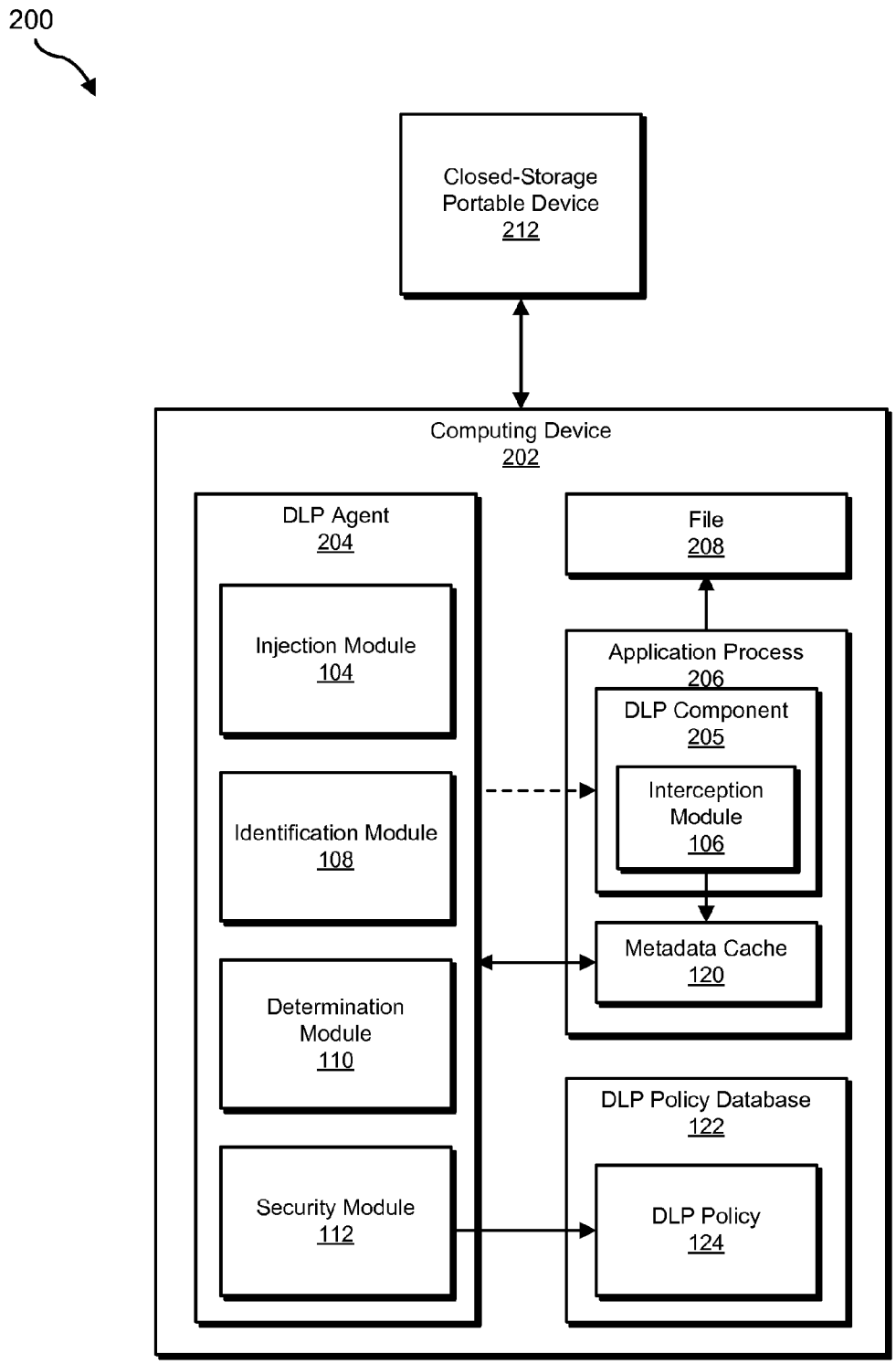
FIG. 2 is a block diagram of an additional exemplary system for applying data loss prevention policies to closed-storage portable devices.
Figure 3:
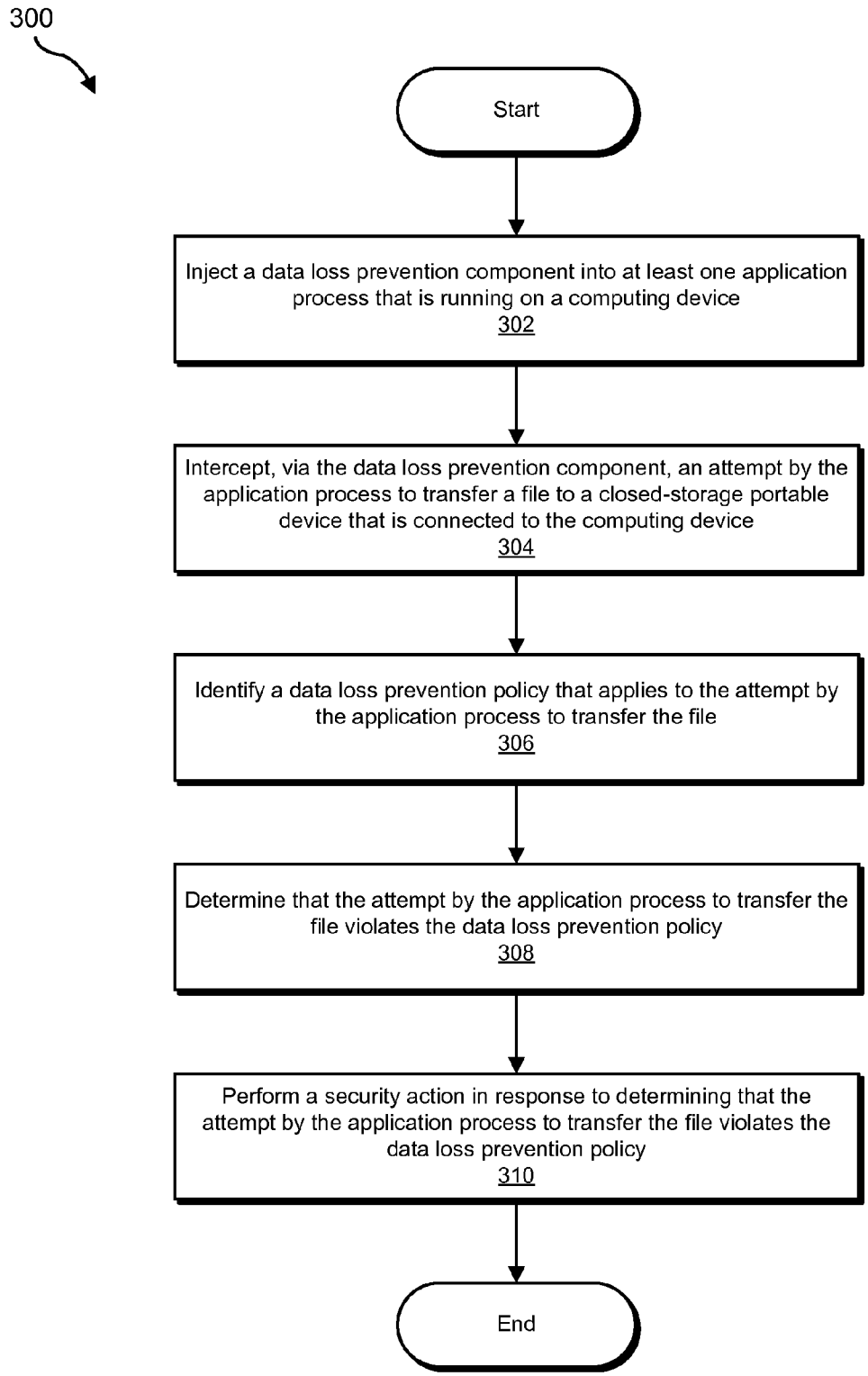
FIG. 3 is a flow diagram of an exemplary method for applying data loss prevention policies to closed-storage portable devices.
Figure 4:
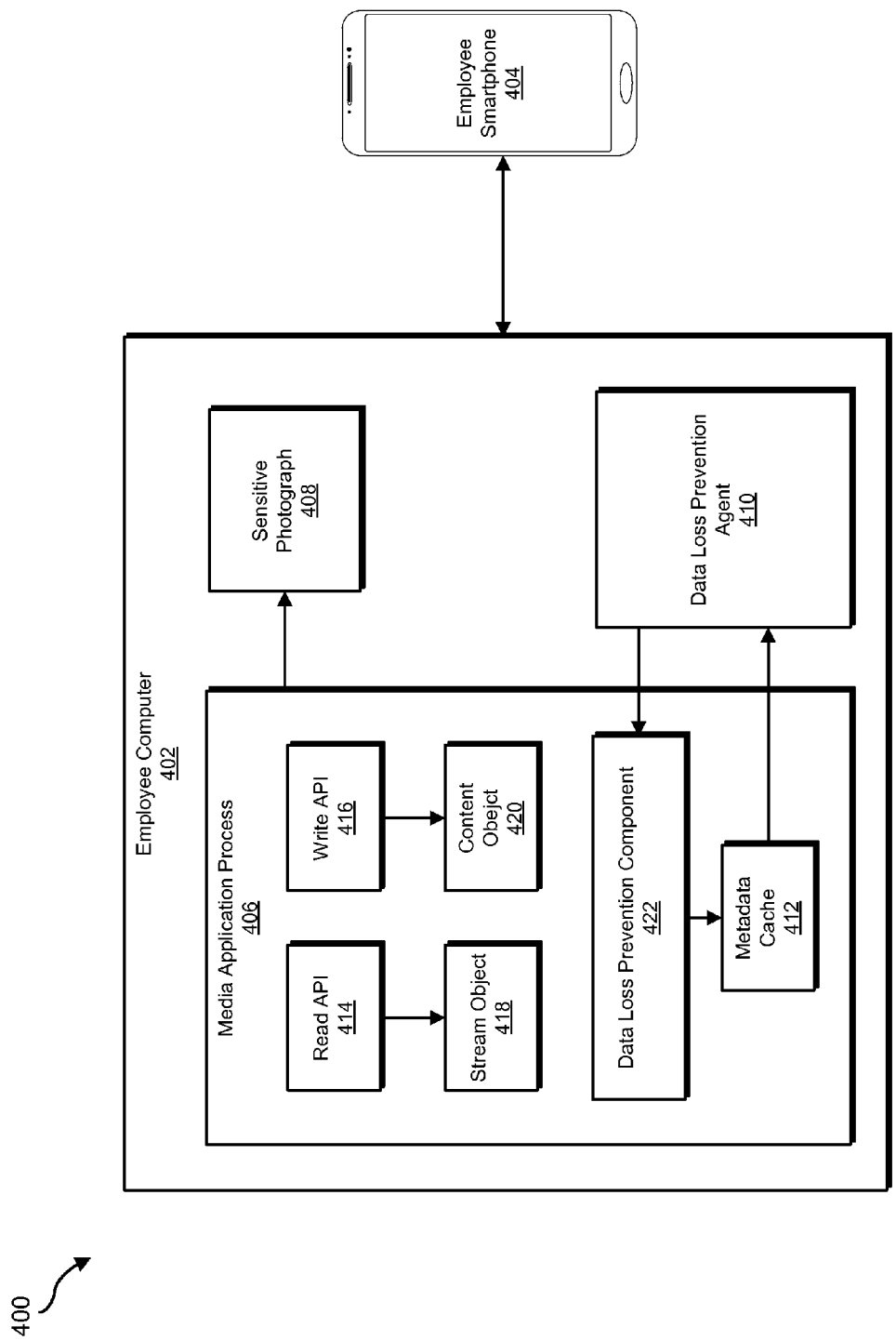
FIG. 4 is a block diagram of an exemplary system for applying data loss prevention polices to a smartphone connected to a computing device.

The following will provide, with reference to FIGS. 1, 2, and 4, detailed descriptions of exemplary systems for applying data loss prevention policies to closed-storage portable devices. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for applying data loss prevention policies to closed-storage portable devices. As illustrated in this figure, exemplary system 100 may include one or more modules 102 for performing one or more tasks. For example, and as will be explained in greater detail below, exemplary system 100 may include an injection module 104 configured to inject a data loss prevention component into at least one application process running on a computing device. Exemplary system 100 may also include an interception module 106 configured to intercept, via the data loss prevention component, an attempt by the application process to transfer a file to a closed-storage portable device that is connected to the computing device. In one example, the closed-storage portable device may contain an internally managed file system that is not accessible to the computing device.

In addition, exemplary system 100 may include an identification module 108 configured to identify a data loss prevention policy that applies to the attempt by the application process to transfer the file. Exemplary system 100 may also include a determination module 110 configured to determine that the attempt by the application process to transfer the file violates the data loss prevention policy. Finally, exemplary system 100 may include a security module 112 configured to perform a security action in response to determining that the attempt by the application process to transfer the file violates the data loss prevention policy. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, employee computing device 402 in FIG. 4, computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more caches, such as metadata cache 120. In some examples, metadata cache 120 may be configured to store metadata collected or gathered from unrelated API calls. For example, data loss prevention component 205 in FIG. 2 may store, within metadata cache 120, metadata associated with API calls used by application processes to read data from and/or write data to closed-storage portable devices. As will be described in greater detail below, the systems described herein may use the information stored in metadata cache 120 to both (1) uniquely identify the files and/or closed-storage portable devices that are the object of file-transfer attempts by application processes and (2) determine whether these file-transfer attempts violate data loss prevention policies.

In addition, exemplary system 100 may include one or more databases, such as data loss prevention policy database 122. In one example, data loss prevention policy database 122 may be configured to store data loss prevention policies, such as data loss prevention policy 124. In some examples, a data loss prevention agent (e.g., data loss prevention agent 204 in FIG. 2) may access, maintain, and/or manage data loss prevention policy database 122. For example, data loss prevention agent 204 may access data loss prevention policy database 122 to determine whether an attempt to transfer a file from a computing device (e.g., computing device 202 in FIG. 2) violates a data loss prevention policy (such as data loss prevention policy 124). If the policy is violated, data loss prevention agent 204 may perform (or instruct data loss component 205 to perform) a security action specified by the policy.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a closed-storage portable device 212. In one example, computing device 202 may be programmed with one or more of modules 102, store all or a portion of the data in database 122, and/or maintain metadata cache 120.

In one embodiment, one or more of modules 102 from FIG. 1 may, when executed by at least one processor of computing device 202, enable computing device 202 to prevent data leaks from computing device 202 to closed-storage portable device 212. For example, injection module 104 may inject a data loss prevention component 205 into at least one application process 206 running on computing device 202. Interception module 106 may then intercept, via data loss prevention component 205, an attempt by application process 206 to transfer a file 208 to closed-storage portable device 212. Identification module 108 may then identify that data loss prevention policy 124 applies to the attempt by application process 206 to transfer file 208, and determination module 110 may determine that the attempt by application process 206 to transfer file 208 violates data loss prevention policy 124. Finally, security module 112 may perform a security action in response to the determination that the attempt by application process 206 to transfer file 208 to closed-storage portable device 212 violates data loss prevention policy 124.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, employee computer 402, exemplary computing system 510 in FIG. 5, or any other suitable computing device.

Closed-storage portable device 212 generally represents any type or form of portable storage device that contains an internally managed file system that is not accessible to a connected computing system and/or that, when communicating with a connected computing device, uses a protocol (such as MTP or PTP) that prevents the connected computing device from accessing the portable storage device's file system. Examples of closed-storage portable device 212 include, without limitation, mobile phones and smartphones (such as IPHONES, ANDROID, WINDOWS, and BLACKBERRY phones), removable storage devices (such as memory cards and flash drives), multimedia players, capture devices (such as cameras), tablet computers, e-book readers, PDAs, wearable computing devices (e.g., smartwatches and computing devices with head-mounted displays), etc.

FIG. 3 is a flow diagram of an exemplary computer-implemented method 300 for applying data loss prevention policies to closed-storage portable devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, employee computer 402, computing system 510 in FIG. 5, and/or portions of exemplary network architecture 600 in FIG. 6.

As illustrated in FIG. 3, at step 302 one or more of the systems described herein may inject a data loss prevention component into at least one application process running on a computing device. For example, injection module 104 may, as part of computing device 202 in FIG. 2, inject data loss prevention component 205 into application process 206.

As used herein, the phrase "data loss prevention component" generally refers to any software module and/or collection of computer-executable instructions capable of implementing at least one part of a data loss prevention system. Examples of the types of actions that data loss prevention components may perform include, without limitation, monitoring, intercepting, blocking, and/or suspending attempts to read and/or write data, collecting and storing information relevant to evaluating whether data loss prevention policies have been violated, sending data and statistics to other data loss prevention components, and/or any other suitable data loss prevention function. Data loss prevention components, and the overarching data loss prevention systems that these data loss prevention components are a part of, may be configured in a variety of ways across a variety of computing devices and networks. For example, these components and systems may be installed on a single computing device (such as an endpoint), multiple computing devices on a shared local network, centrally managed servers, gateways, or other computing devices within an enterprise network, or any other suitable configuration or number of computing devices.

In some embodiments, the data loss prevention component may include a collection of components that act together to perform one or more data loss prevention functions. For example, a data loss prevention component that has been injected into an application process for the purpose of monitoring the application process may include several components, such as a component that monitors API calls, a component that performs security actions (such as suspending or blocking read or write attempts by application processes), a component that collects and stores or caches metadata relevant to determining whether data loss prevention policies have been violated, a component that sends out alerts when data loss prevention policies have been violated, a component that communicates with other applications and/or data loss prevention components via Inter-Process Communication (IPC) protocols, and/or any other suitable component capable of performing data loss prevention functions.

As used herein, the phrase "application process" generally refers to an instance of a computer program executed by a computing device. Examples of application processes include, without limitation, processes associated with application software (such as WINDOWS MEDIA PLAYER or ITUNES), processes associated with system software (such as explorer.exe on WINDOWS computing devices), processes initiated by a user or by another process, processes that automatically execute when a computing device detects a connected portable device (e.g., AUTORUN or AUTOPLAY processes), or any other suitable process.

The systems described herein may perform step 302 in a variety of ways. In one example, the systems described herein may inject the data loss prevention component into each application process running on the computing device. For example, injection module 104 may inject data loss prevention component 205 into each application process launched (either during or after startup) on computing device 202. By doing so, data loss prevention agent 204 may ensure that all application processes that are capable of leaking data to closed-storage portable devices are monitored.

In other examples, however, injection module 104 may only inject data loss prevention component 205 into application processes that are known to be capable of transferring files to closed-storage portable devices. For example, injection module 104 may only inject data loss prevention component 205 into application processes (such as ITUNES, WINDOWS MEDIA PLAYER, and/or the WINDOWS explorer shell) that utilize communication protocols (such as MTP or PTP) that facilitate the transfer of files to closed-storage portable devices.

Returning to FIG. 3, at step 304 one or more of the systems described herein may intercept, via the data loss prevention component, an attempt by the application process to transfer a file to a closed-storage portable device that is connected to the computing device. For example, interception module 106 may, as part of computing device 202 in FIG. 2, intercept, via data loss prevention component 205, an attempt by application process 206 to transfer file 208 to closed-stored portable device 212.

The phrase "attempt to transfer a file," as used herein, generally refers to any attempt by either a computing device or a closed-storage portable device to copy, move, share, link, sync, shift, transpose, image, reproduce, and/or otherwise "transfer" a file from a computing device to a closed-storage portable device. File-transfer attempts may utilize and/or involve any of a variety of suitable processes, protocols, and/or methods, including MTP and PTP.

In addition, the phrase "closed-storage portable device," as used herein, generally refers to any portable device that manages its own storage and/or file system and/or that prevents a connected computing device from managing and/or controlling the portable device's storage and/or file system. In some examples, closed-storage portable devices may connect to an endpoint computing device via a closed-storage protocol, such as MTP or PTP, that prevents the endpoint from managing the portable device's storage or file system. Closed-storage portable devices stand in contrast to open-storage portable devices, which connect to endpoint computing devices using open-storage or mass-storage protocols that enable the endpoint to assume absolute control over storage on the portable device as a block-level device.

Examples of closed-storage portable devices include, without limitation, mobile phones and smartphones (such as IPHONES, ANDROID, WINDOWS, and BLACKBERRY phones), removable storage devices (such as memory cards and flash drives), multimedia players, capture devices (such as cameras), tablet computers, e-book readers, PDAs, wearable computing devices (e.g., smartwatches and computing devices with head-mounted displays), etc.

The systems and methods described herein may perform step 304 in a variety of ways. In some embodiments, interception module 106 may perform step 304 by intercepting an attempt by application process 206 to call an API that facilitates the transfer of data to closed-storage portable device 212. For example, interception module 106 may intercept an attempt by application process 206 to call an API used to create a stream object and/or a content object. The term "stream object," as used herein, generally refers to any code object created by an API when reading data from a file stored on a computing device. In contrast, the term "content object," as used herein, generally refers to any code object created by an API when writing data to a portable device, such as closed-storage portable device 212. For example, interception module 106 may intercept an attempt by application process 206 to call a WINDOWS API used to create a stream object to read data from file 208 stored on computing device 202 in preparation for transferring the same to closed-storage portable device 212. Interception module 106 may also intercept an attempt by application process 206 to call a Component Object Module (COM) API used to create a content object to write file 208 to closed-storage portable device 212.

In at least one example, identification module 108 may, as part of data loss prevention component 205, identify and cache, within metadata cache 120, information associated with an attempt by application process 206 to call an API that facilitates the transfer of data to closed-storage portable device 212, such as APIs used to create stream or content objects. Examples of the types of information that identification module 108 may collect and store within metadata cache 120 include, without limitation, metadata that identifies (1) a file name for file 208, (2) a file path for file 208, (3) a file size for file 208, (4) a device name associated with closed-storage portable device 212, (5) a device identifier associated with closed-storage portable device 212, (6) a device manufacturer associated with closed-storage portable device 212, and/or (7) any other type or form of information that may be helpful in uniquely identifying file 208 and/or closed-storage portable device 212.

In some embodiments, the systems and methods described herein may uniquely identify, by analyzing the cached metadata collected from the various unrelated API calls, (1) the file that the application process is attempting to transfer and/or (2) the closed-storage portable device that the application process is attempting to transfer data to. For example, identification module 108 may determine, by analyzing (using, e.g., various heuristics) the metadata stored within metadata cache 120, that application process 206 is attempting to transfer file 208 to closed-storage portable device 212.

In some examples, data loss prevention agent 204 may access and/or receive some or all of the information stored within metadata cache 120 via an IPC protocol. For example, interception module 106 may transmit, and/or data loss prevention agent 204 may obtain, the metadata stored within metadata cache via an IPC protocol. As will be described in greater detail below, this metadata may be useful in both (1) identifying the file that the application process is attempting to transfer and/or the closed-storage portable device that the application process is attempting to transfer data to and/or (2) determining whether a data loss prevention policy has been violated and, therefore, whether a security action should be performed.

In one example, when interception module 106 intercepts the attempt by application process 206 to transfer file 208, interception module 106 may also suspend the same. In this example, interception module 106 may suspend the attempt while determination module 110 determines whether the attempt violates a data loss prevention policy. Specifically, and as will be described in greater detail below, interception module 106 may suspend the attempt long enough to communicate with and/or receive instructions from data loss prevention agent 204.

Returning to FIG. 3, at step 306 one or more of the systems described herein may identify a data loss prevention policy that applies to the attempt by the application process to transfer the file. For example, identification module 108 may, as part of computing device 202 in FIG. 2, identify a data loss prevention policy 124 that applies to the attempt by application process 206 to transfer file 208.

As used herein, the phrase "data loss prevention policy" generally refers to any type or form of policy and/or rule that describes, defines, or otherwise identifies content that an organization desires to protect. In some examples, the phrase "data loss prevention policy" may also refer to a policy and/or rule that describes or defines how users and/or devices may interact with content that an organization desires to protect.

For example, data loss prevention policy 124 may specify that a file (such as file 208) contains or represents sensitive information that is to be protected if the file satisfies one or more criteria relating to various predetermined attributes or characteristics, including temporal characteristics of the file (such as when the file was created or last modified), geolocation characteristics of the file (such as whether the file was created on company property or in a public location, such as an airport), characteristics of an application responsible for creating or storing the file (such as whether an application responsible for creating the file has been verified or signed, whether a vendor of the application is trusted, or the like), characteristics of a user responsible for creating or storing the file (such as whether the user represents a company executive or senior engineer), characteristics of the file itself (e.g., the file's content or the file's type), or any other characteristic that may be useful in determining whether the file contains sensitive information that should be protected.

Similarly, data loss prevention policy 124 may specify various criteria for evaluating attempts to transfer sensitive information from computing device 202 to a removable storage device (such as closed-storage portable device 212). Examples of the types of criteria included within data loss prevention policy 124 that may be used to evaluate such attempts include, without limitation, criteria relating to a temporal characteristic of the attempt (e.g., whether the attempt originated during business hours), criteria relating to an application associated with the attempt (e.g., whether the application has been verified and/or signed and/or whether a vendor of the application is trusted), criteria relating to security credentials associated with the attempt (e.g., whether the attempt contains or includes required user, device, and/or application credentials), criteria relating to the target storage device (e.g., whether the target storage device is blacklisted or whitelisted or implements required security protocols, such as encryption, etc.), criteria relating to the file in question, criteria relating to a geolocation associated with the attempt (e.g., whether the request originated from a secure location, such as company property), or any other criteria that may be relevant to evaluating the propriety of an attempt to transfer or otherwise access sensitive information.

The systems and methods described herein may perform step 306 in a variety of ways. In one example, identification module 108 may identify, by analyzing metadata cache 120, a data loss prevention policy (e.g., data loss prevention policy 124) that applies to the attempt by application process 206 to transfer file 208. For example, identification module 108 may determine, by analyzing metadata cache 120, that the attempt by application process 206 to transfer file 208 involves a file, application, user, device, time, geolocation, etc. specified or otherwise covered by data loss prevention policy 124.

Returning to FIG. 3, at step 308 one or more of the systems described herein may determine that the attempt by the application process to transfer the file violates the data loss prevention policy. For example, determination module 110 may, as part of computing device 202 in FIG. 2, determine that the attempt by application process 206 to transfer file 208 violates data loss prevention policy 124.

The systems and methods described herein may perform step 308 in a variety of ways. In one embodiment, determination module 110 may determine, by analyzing metadata cache 120 and/or the contents of the file in question, that the attempt by application process 206 to transfer file 208 involves a file, application, user, device, time, geolocation, etc. that violates data loss prevention policy 124. For example, determination module 110 may, as part of data loss prevention agent 204 in FIG. 2, determine (by, e.g., scanning file 208 for sensitive information, analyzing metadata cache 120, and/or evaluating data loss prevention policy 124) that a user of computing device 202 should not be permitted to transfer file 208 to closed-storage portable device 212.

Returning to FIG. 3, at step 310 one or more of the systems described herein may perform a security action in response to determining that the attempt by the application process to transfer the file violates the data loss prevention policy. For example, security module 112 may, as part of computing device 202 in FIG. 2, perform a security action in response to determining that the attempt by application process 206 to transfer file 208 violates data loss prevention policy 124.

As used herein, the term "security action" generally refers to any type or form of process that attempts to protect against data leaks. Examples of security actions include, without limitation, scanning files, blocking or suspending file transfer attempts, logging security information, sending alerts, monitoring file activity, and/or any other suitable security action.

The systems and methods described herein may perform step 310 in a variety of ways. For example, security module 112 may scan file 208 for sensitive information, block the attempt by application process 206 to transfer file 208, log information about the attempt by application process 206 to transfer file 208, notify a security administrator about the attempt by application process 206 to transfer file 208, and/or perform any other suitable security action in response to the determination that the attempt by application process 206 to transfer file 208 to closed-storage portable device 212 violates data loss prevention policy 124.

FIG. 4 is a block diagram of a system 400 that illustrates how the systems and methods described herein may apply data loss prevention policies to closed-storage portable devices. In this example, a data loss prevention agent 410 may inject a data loss prevention component 422 into a media application process 406 executing on an employee computer 402. At a later point in time, data loss prevention component 422 may intercept an attempt by media application process 406 to copy and transfer a sensitive photograph 408 to an employee smartphone 404 connected to employee computer 402 via MTP. In this example, data loss prevention component 422 may identify this attempt by identifying an attempt by media application process 406 to (1) create a stream object 418 (using, e.g., read API 414) to read data from sensitive photograph 408 and/or (2) create a content object 420 (using, e.g., write API 416) to write data to employee smartphone 404.

Upon identifying and intercepting the file-transfer attempt, data loss prevention component 422 may identify and cache metadata from read API 414, write API 416, stream object 418, and/or content object 420 in metadata cache 412 that identifies both the file path and file name of sensitive photograph 408 and a unique device name or identifier for employee smartphone 404, among other identifying features. Data loss prevention component 422 may then transmit, or notify data loss prevention agent 410 of, this metadata via an IPC protocol.

Upon receiving or being notified of this metadata, data loss prevention agent 410 may, using various heuristics, analyze the same to uniquely identify the targeted file and/or storage device (in this case, sensitive photograph 408 and employee smartphone 404). Data loss prevention agent 410 may then determine whether a data loss prevention policy applies to the attempt by media application process 406 to copy sensitive photograph 408 to employee smartphone 404. For example, data loss prevention agent 410 may determine whether the file-transfer attempt involves a file, application, user, device, time, geolocation, etc. specified or otherwise covered by data loss prevention policy 124.

If data loss prevention agent 410 determines that data loss prevention policy 124 applies to the attempt by media application process 406 to copy sensitive photograph 408 to employee smartphone 404, then data loss prevention agent 410 may evaluate whether the attempt violates data loss prevention policy 124. For example, data loss prevention agent 410 may scan sensitive photograph 408 to determine whether it contains sensitive information, determine whether a user of employee computer 402 is authorized to transfer sensitive information, determine whether employees are allowed to transfer sensitive information to portable storage devices, etc.

If data loss prevention agent 410 determines that the file-transfer attempt violates data loss prevention policy 124, then data loss prevention agent 410 may perform a security action that prevents sensitive photograph 408 from leaking to employee smartphone 404. For example, data loss prevention agent 410 may (1) send a notification to data loss prevention component 422 instructing the same to block the attempt by media application process 406 to copy sensitive photograph 408, (2) add an entry into a log that keeps track of attempts to transfer sensitive files to portable devices, and/or (3) notify a security administrator (by, e.g., email alert) about the attempt by media application process 406 to transfer sensitive photograph 408.

As explained above in connection with method 300 in FIG. 3, software security vendors are continually looking to implement new data loss prevention processes and methods to address the rapid proliferation of smart devices within organizations. While software security vendors may already address potential avenues for data leaks over mass-storage device protocols, other avenues for data leaks, such as via storage devices connected by MTP, may not be sufficiently addressed. For example, smart devices that communicate and transfer data via MTP may prevent an endpoint from accessing and/or managing the file system on the smart device, which may in turn prevent conventional security software on the endpoint from adequately monitoring MTP smart devices for data leaks.

The instant disclosure may overcome this problem by injecting a data loss prevention component into one or more application processes running on an endpoint computing device and then monitoring attempts by those application processes to transfer sensitive files. Specifically, by identifying (and caching metadata associated with) attempts by application processes to call APIs used to read and/or write data to closed-storage portable devices, the systems and methods described herein may effectively identify (using, e.g., various heuristics) the files and/or storage devices that are the targets of such file-transfer attempts, even if the storage devices are connected via closed-storage protocols such as MTP or PTP. This may in turn may allow software security vendors to provide clients with robust, nuanced, content-aware data loss prevention systems that are capable of blocking file-transfer attempts to closed-storage portable devices on a case-by-case (as opposed to wholesale) basis.

Figure 5:
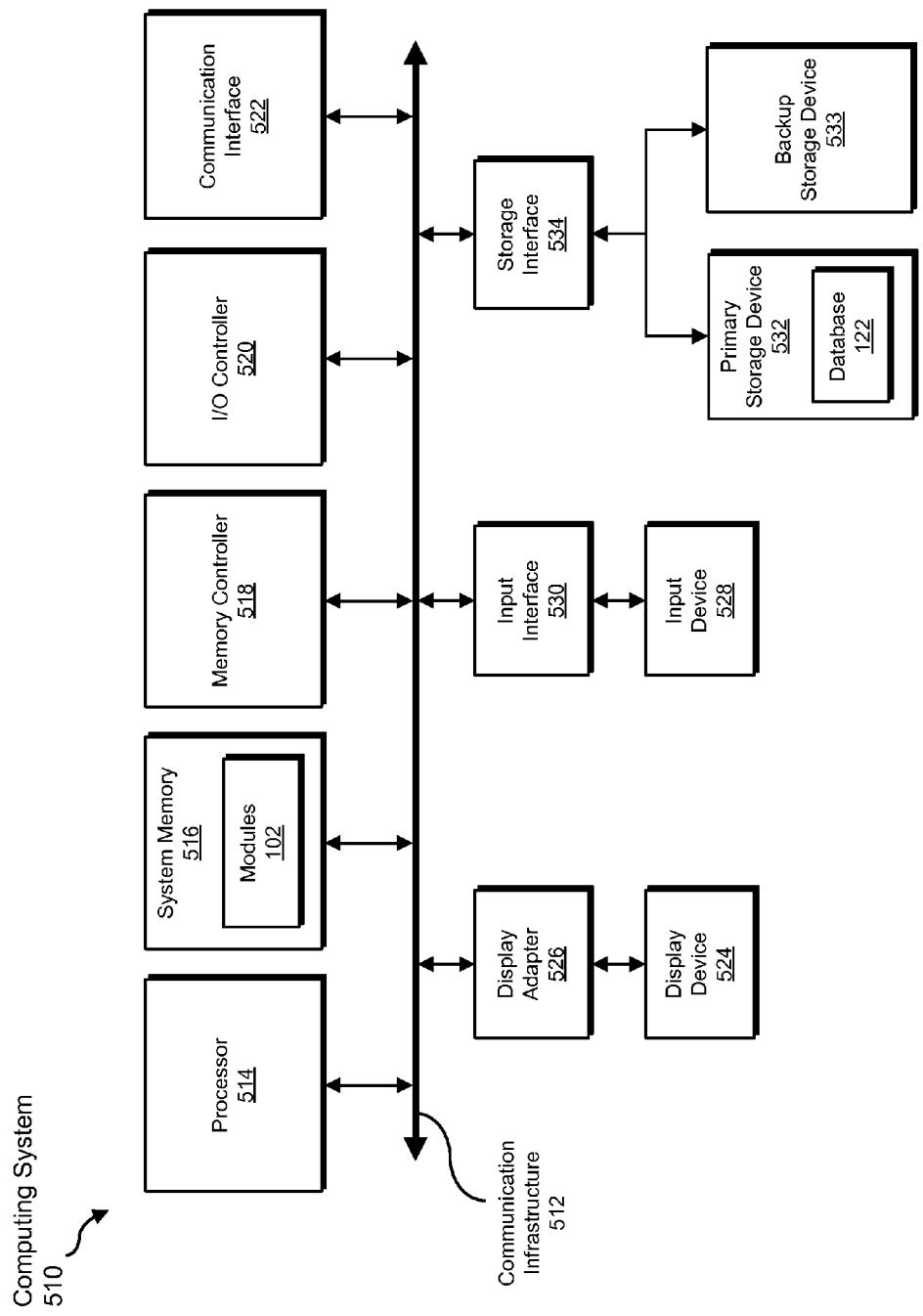
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, metadata cache 120 and/or data loss prevention policy database 122 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
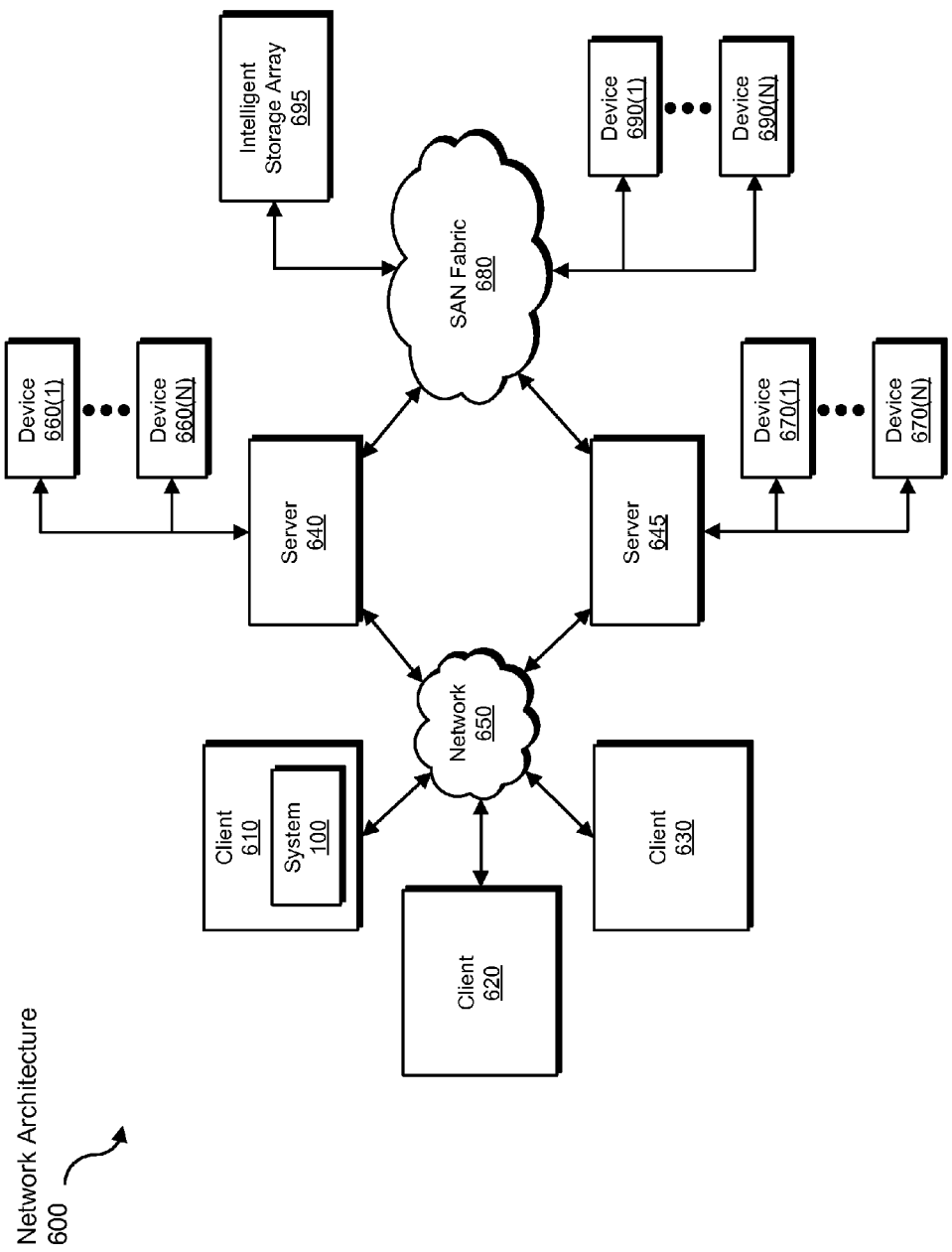
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for applying data loss prevention policies to closed-storage portable devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform an application process by injecting a data loss prevention component into the application process. In another example, one or more of the modules herein may transform a communication process between a closed-storage portable device and a computing device by interrupting, monitoring, suspending, and/or blocking the communication process. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for applying data loss prevention policies to closed-storage portable devices, at least a portion of the method being performed by a computing device comprising at least one processor, the method comprising:

injecting, into at least one application process running on the computing device, a data loss prevention component that monitors Application Programming Interface (API) calls used by the application process;

intercepting, via the data loss prevention component that monitors API calls used by the application process, an attempt by the application process to transfer a file by calling an API that facilitates transferring the file from the computing device to a closed-storage portable device that is connected to the computing device via a closed-storage protocol, wherein the closed-storage portable device contains an internally managed file system that is not accessible to the computing device;

identifying a data loss prevention policy that applies to the attempt by the application process to transfer the file;

determining that the attempt by the application process to transfer the file violates the data loss prevention policy;

performing a security action in response to determining that the attempt by the application process to transfer the file violates the data loss prevention policy.

2. The computer-implemented method of claim 1, wherein injecting the data loss prevention component into the at least one application process that is running on the computing device comprises injecting the data loss prevention component into each application process running on the computing device.

3. The computer-implemented method of claim 1, wherein intercepting the attempt to transfer the file comprises suspending the attempt by the application process to transfer the file.

4. The computer-implemented method of claim 1, wherein determining that the attempt by the application process to transfer the file violates the data loss prevention policy comprises analyzing at least one of:
 a temporal characteristic of the file;
 a geolocation characteristic of the file;
 a characteristic of an application responsible for creating the file;
 a characteristic of a user responsible for creating the file;
 a characteristic of content of the file.

5. The computer-implemented method of claim 1, wherein the API comprises at least one of:
 an API used to create a stream object;
 an API used to create a content object.

6. The computer-implemented method of claim 1, further comprising identifying and caching metadata associated with the attempt to call the API that identifies at least one of:
 the file's name;
 a file path for the file;
 the file's size;
 a device name associated with the closed-storage portable device;
 a device identifier associated with the closed-storage portable device;
 a device manufacturer associated with the closed-storage portable device.

7. The computer-implemented method of claim 6, further comprising uniquely identifying, by analyzing the cached metadata, at least one of:
 the file;
 the closed-storage portable device.

8. The computer-implemented method of claim 6, further comprising sending the metadata to a data loss prevention agent that uses the metadata to:
 identify the data loss prevention policy that applies to the attempt by the application process to transfer the file;
 determine that the attempt by the application process to transfer the file violates the data loss prevention policy.

9. The computer-implemented method of claim 1, wherein performing the security action comprises at least one of:
 scanning the file for sensitive information;
 blocking the attempt by the application process to transfer the file;
 logging information about the attempt by the application process to transfer the file;
 notifying a security administrator about the attempt by the application process to transfer the file.

10. The computer-implemented method of claim 1, wherein the closed-storage protocol comprises at least one of:
 Media Transfer Protocol (MTP);
 Picture Transfer Protocol (PTP).

11. A system for applying data loss prevention policies to closed-storage portable devices, the system comprising:
 an injection module, stored in memory, that injects, into at least one application process running on a computing device, a data loss prevention component that monitors API calls used by the application process;
 an interception module, stored in memory, that intercepts, via the data loss prevention component that monitors API calls used by the application process, an attempt by the application process to transfer a file by calling an API that facilitates transferring the file from the computing device to a closed-storage portable device that is connected to the computing device via a closed-storage protocol, wherein the closed-storage portable device contains an internally managed file system that is not accessible to the computing device;
 an identification module, stored in memory, that identifies a data loss prevention policy that applies to the attempt by the application process to transfer the file;
 a determination module, stored in memory, that determines that the attempt by the application process to transfer the file violates the data loss prevention policy;
 a security module, stored in memory, that performs a security action in response to determining that the attempt by the application process to transfer the file violates the data loss prevention policy;
 at least one processor configured to execute the injection module, the interception module, the identification module, the determination module, and the security module.

12. The system of claim 11, wherein the injection module injects the data loss prevention component into each application process running on the computing device.

13. The system of claim 11, wherein the interception module suspends the attempt by the application process to transfer the file.

14. The system of claim 11, wherein the determination module analyzes at least one of:
 a temporal characteristic of the file;
 a geolocation characteristic of the file;
 a characteristic of an application responsible for creating the file;
 a characteristic of a user responsible for creating the file;
 a characteristic of content of the file.

15. The system of claim 11, wherein the identification module identifies and caches metadata associated with the attempt to call the API that identifies at least one of:
 the file's name;
 a file path for the file;
 the file's size;
 a device name associated with the closed-storage portable device;

a device identifier associated with the closed-storage portable device;

a device manufacturer associated with the closed-storage portable device.

16. The system of claim 15, wherein the identification module uniquely identifies, by analyzing the cached metadata, at least one of:

the file;

the closed-storage portable device.

17. The system of claim 15, wherein the identification module sends the metadata to a data loss prevention agent that uses the metadata to:

identify the data loss prevention policy that applies to the attempt by the application process to transfer the file;

determine that the attempt by the application process to transfer the file violates the data loss prevention policy.

18. The system of claim 11, wherein the security module performs the security action by performing at least one of:

scanning the file for sensitive information;

blocking the attempt by the application process to transfer the file;

logging information about the attempt by the application process to transfer the file;

notifying a security administrator about the attempt by the application to transfer the file.

19. A non-transitory computer-readable-storage medium comprising one or more computer-executable instructions that, when executed by at least one processor of a computing device, cause the computing device to:

inject, into at least one application process that is running on the computing device, a data loss prevention component that monitors API calls used by the application process;

intercept, via the data loss prevention component that monitors the API calls used by the application process, an attempt by the application process to transfer a file by calling an API that facilitates transferring the file from the computing device to a closed-storage portable device that is connected to the computing device via a closed-storage protocol, wherein the closed-storage portable device contains an internally managed file system that is not accessible to the computing device;

identify a data loss prevention policy that applies to the attempt by the application process to transfer the file;

determines that the attempt by the application process to transfer the file violates the data loss prevention policy;

perform a security action in response to determining that the attempt by the application process to transfer the file violates the data loss prevention policy.

20. The non-transitory computer-readable-storage medium of claim 19, wherein the one or more computer-executable instructions cause the computing device to inject the data loss prevention component into each application process running on the computing device.

* * * * *

UNITED STATES PATENT AND TRADEMARK OFFICE
CERTIFICATE OF CORRECTION

PATENT NO.        : 9,100,440 B1
APPLICATION NO.   : 14/245994
DATED             : August 4, 2015
INVENTOR(S)       : Sarin Sumit Manmohan Page 1 of 1

It is certified that error appears in the above-identified patent and that said Letters Patent is hereby corrected as shown below:

IN THE CLAIMS

Claim 19, at column 22, lines 18 to 19, should read:

determine that the attempt by the application process to transfer the file violates the data loss prevention policy;

Signed and Sealed this
First Day of March, 2016

Michelle K. Lee
*Director of the United States Patent and Trademark Office*